United States Patent
Hu et al.

(10) Patent No.: US 9,423,630 B2
(45) Date of Patent: Aug. 23, 2016

(54) OPTICAL IMAGE STABILIZER WITH IMPROVED MAGNETIC SENSITIVITY

(71) Applicant: TDK TAIWAN CORP., Yangmei (TW)

(72) Inventors: Chao-Chang Hu, Yangmei (TW);
Fu-Yuan Wu, Yangmei (TW);
Shih-Ting Huang, Yangmei (TW);
Jyun-Jie Lin, Yangmei (TW); Yi-Ho Chen, Yangmei (TW)

(73) Assignee: TDK TAIWAN CORP., Yangmei (TW)

( * ) Notice: Subject to any disclaimer, the term of this patent is extended or adjusted under 35 U.S.C. 154(b) by 51 days.

(21) Appl. No.: 14/305,666

(22) Filed: Jun. 16, 2014

(65) Prior Publication Data

US 2014/0368915 A1    Dec. 18, 2014

Related U.S. Application Data

(60) Provisional application No. 61/836,038, filed on Jun. 17, 2013.

(51) Int. Cl.
*G02B 27/64* (2006.01)
*G02B 7/09* (2006.01)
*G02B 7/08* (2006.01)
*H04N 5/232* (2006.01)

(52) U.S. Cl.
CPC ............ *G02B 27/646* (2013.01); *G02B 7/08* (2013.01); *G02B 7/09* (2013.01); *G03B 2205/0007* (2013.01); *H04N 5/23264* (2013.01)

(58) Field of Classification Search
CPC ............ G02B 27/64; G02B 27/646; G03B 2205/0007; G03B 2205/0015; G03B 2205/0023; G03B 2205/003; G03B 2205/0038; G03B 2205/0053; G03B 2205/0061; G03B 2205/0069; G03B 2205/0076; G03B 2205/0084; H04N 5/23248; H04N 5/23264; H04N 5/2328; H04N 5/23283; H04N 5/23287
USPC ...... 359/554, 555, 556, 557; 396/52, 53, 54, 396/55, 12, 13; 348/208.99, 208.4, 208.5, 348/208.6, 208.7, 208.8, 208.11
See application file for complete search history.

(56) References Cited

U.S. PATENT DOCUMENTS

| | | | | |
|---|---|---|---|---|
| 8,041,201 B2 * | 10/2011 | Eromaki | ........... | G02B 7/102 |
| | | | | 359/554 |
| 8,582,205 B2 * | 11/2013 | Hasegawa | ........... | G02B 27/646 |
| | | | | 348/208.99 |
| 2010/0178044 A1 * | 7/2010 | Ohno | ........... | G03B 5/00 |
| | | | | 396/55 |
| 2015/0195439 A1 * | 7/2015 | Miller | ........... | G02B 27/646 |
| | | | | 348/208.7 |

FOREIGN PATENT DOCUMENTS

KR   20140003716 A  *  1/2014

* cited by examiner

*Primary Examiner* — Arnel C Lavarias
(74) *Attorney, Agent, or Firm* — Bacon & Thomas, PLLC

(57) ABSTRACT

A lens driving device that is based on a Voice Coil Actuator (VCA) structure and provides the auto-focusing and optical image stabilization (OIS) functions. These two functions can be realized by a common magnet scheme, or a separate magnet scheme. Also, the present invention provides an improved structure for the lens driving device to enhance the function of OIS thereof. By arranging a magnetic enhancement device below the OIS coils in the lens driving device, the magnetic driving force of the OIS coils and magnetic induction of the Hall sensors, if present, can be enhanced, and the magnetic sensitivity thereof may be also improved.

8 Claims, 10 Drawing Sheets

OPTICAL IMAGE STABILIZER WITH IMPROVED MAGNETIC SENSITIVITY

CROSS-REFERENCE TO RELATED APPLICATION

This application claims benefit of U.S. Provisional Patent Application No. 61/836,038, filed Jun. 17, 2013, the entire contents of which are hereby incorporated by reference.

BACKGROUND OF THE INVENTION

1. Field of the Invention

The present invention relates to a VCA-based lens driving device, and more particularly, to a VCA-based lens driving device that enables the auto-focusing (AF) and the optical image stabilization (OIS).

2. Description of the Prior Art

The optical image stabilization (OIS) with a common magnet scheme has been developed as a solution of anti-shaking for a conventional lens driving device. Driving two sets of coils, e.g. the auto-focusing (AF) coil and the OIS coils, with a common magnet set to adjust the lens assembly makes the lens driving device compact, and is thus getting widely applicable for enhancing the image quality. Nevertheless, it is found that such a conventional scheme may have some disadvantages.

For example, in the known lens driving device, the OIS coils formed with the coil plate are typically different in length and/or are asymmetric. Such difference or asymmetry leads to a yawing effect, which makes the lens assembly and the magnet rotate unintentionally. The rotating of the lens assembly and the magnet will make the displacement sensor fail to detect the displacement correctly, such that the lens driving device cannot enable the auto-focusing and mage stabilization. Besides, in order to realize the AF and OIS functions in a greater precision, the magnetic sensitivity of the OIS coil structure needs to be further improved.

SUMMARY OF THE INVENTION

An object of the present invention provides a VCA-based lens driving device with an improved optical image stabilization (OIS) coil structure and improved magnetic sensibility for image stabilization. According to the present invention, the auto-focusing (AF) function and the OIS function can be realized by either a common magnet scheme or a separate magnet scheme. It is also an object of the present invention to provide an improved structure for the lens driving device to enhance the function of OIS thereof.

Therefore, in one aspect, the present invention provides a lens driving device including a lens assembly having an optical axis, an auto-focusing (AF) coil disposed around an outer surrounding of the lens assembly with respect to the optical axis, a set of optical image stabilization (OIS) coils disposed on a plane having a normal direction perpendicular to the optical axis, a plurality of magnets arranged above the set of OIS coils in such a way that each of the magnets has a first surface facing the AF coil and a second surface facing the OIS coils, and a magnetic enhancement device disposed under the set of OIS coils.

Preferably, the magnetic enhancement device includes plural magnetic pieces, each of which being disposed under a respective OIS coil of the set of OIS coils. The plural magnetic pieces can be formed with a bottom frame of the lens driving device, or can be embedded in a bottom frame of the lens driving device. Alternatively, the magnetic enhancement device is formed by distributing a plurality of magnetic particles within a bottom frame of the lens driving device.

Preferably, the lens driving device further including at least one magnetic induction element for sensing a magnet signal induced by a displacement of the magnets, and each of the plural magnetic pieces of the magnetic enhancement device is disposed under a respective OIS coil of the set of OIS coils or the at least one magnetic induction element.

In another aspect, the present invention provides a lens driving device, including a lens assembly having an optical axis, an auto-focusing (AF) coil disposed around an outer surrounding of the lens assembly with respect to the optical axis, a set of optical image stabilization (OIS) coils disposed on a plane having a normal direction perpendicular to the optical axis, a magnet group including a set of first magnets and a set of second magnets, and a magnetic enhancement device disposed under the set of OIS coils. The first magnets are arranged above the set of OIS coils correspondingly in such a way that each thereof has a surface facing to the AF coil, while the second magnets are arranged above the set of OIS coils correspondingly in such a way that each of the second magnets has a surface facing to the OIS coils.

Preferably, the magnetic enhancement device includes plural magnetic pieces, each of which being disposed under a respective OIS coil of the set of OIS coils. The plural magnetic pieces can be formed with a bottom frame of the lens driving device, or can be embedded in a bottom frame of the lens driving device. Alternatively, the magnetic enhancement device is formed by distributing a plurality of magnetic particles within a bottom frame of the lens driving device.

Preferably, the lens driving device further including at least one magnetic induction element for sensing a magnet signal induced by a displacement of the magnets, and each of the plural magnetic pieces of the magnetic enhancement device is disposed under a respective OIS coil of the set of OIS coils or the at least one magnetic induction element.

DETAILED DESCRIPTION OF THE PREFERRED EMBODIMENTS

The present invention now will be described more fully hereinafter with reference to the accompanying drawings, in which preferred embodiments of the present invention are shown.

The present invention provides a lens driving device that is based on a Voice Coil Actuator (VCA) structure and provides the auto-focusing and optical image stabilization (OIS) functions. According to the present invention, these two functions can be realized by a common magnet scheme, or a separate magnet scheme. Besides, the present invention also provides an improved structure for the lens driving device to enhance the effect of AF and OIS functions thereof.

Figure 1:
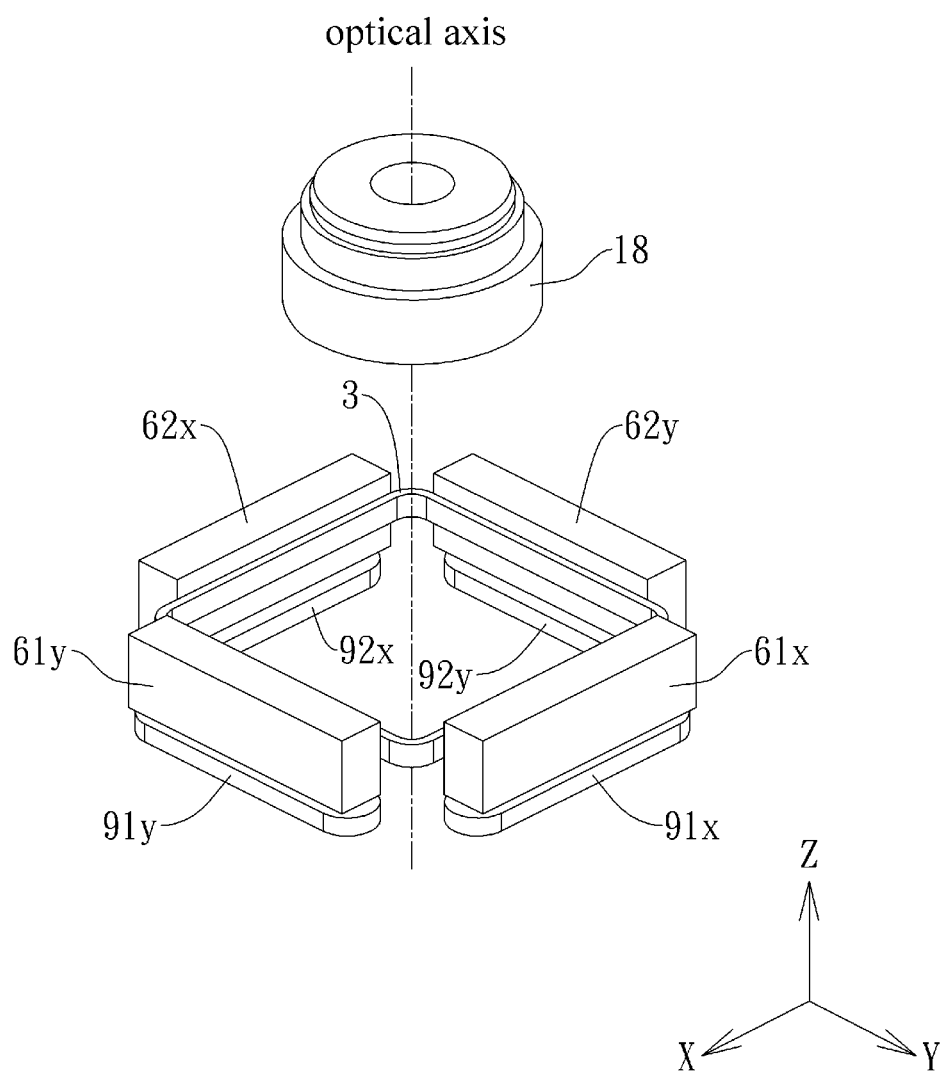
FIG. 1 is a schematic perspective view of a lens driving device according to a first embodiment of the present invention.
Figure 2:
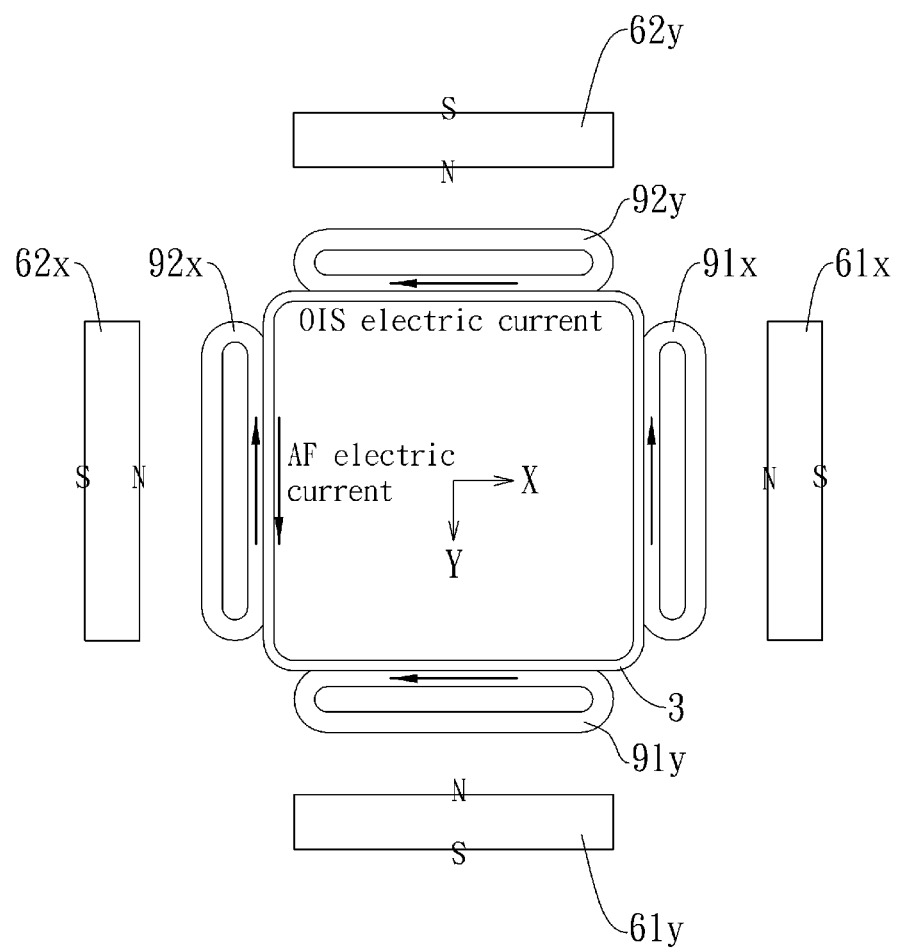
FIG. 2 is a schematic top exploded view of the lens driving device as shown in FIG. 1.

Please refer to FIG. 1 and FIG. 2, which are a schematic perspective view and a schematic top exploded view showing the lens driving device according to a first embodiment of the present invention, respectively. It should be noted that some components of the lens driving device are not shown in these figures, so as to avoid an unnecessary obscuring of the present invention. As shown in FIG. 1, the lens driving device mainly includes a lens assembly 18 having an optical axis, an auto-focusing coil (AF coil) 3, a set of OIS coils 91x, 91y, 92x, 92y, and a plurality of magnets 61x, 61y, 62x, 62y. In the present invention, the optical axis of the lens assembly 18 is defined as the Z-axis for illustration. The AF coil 3 and the magnets 61x, 61y, 62x, 62y are disposed around an outer surrounding of the lens assembly 18 with respect to the optical axis. The OIS coils 91x, 91y, 92x, 92y are disposed on a plane whose normal direction is perpendicular to the optical axis (e.g. the X-Y plane).

Referring to FIG. 2, each of the magnets 61x, 61y, 62x, 62y has an inner N pole and an outer S pole. The AF coil 3 and the set of OIS coils 91x, 91y, 92x, 92y share a common magnet set composed of the magnets 61x, 61y, 62x, 62y. In this embodiment, the magnets 61x, 61y, 62x, 62y and the OIS coils 91x, 91y, 92x, 92y below the magnets are disposed in such a way that each of the magnets 61x, 61y, 62x, 62y has a first surface facing the AF coil 3, and a second surface facing a respective one of the OIS coils 91x, 91y, 92x, 92y. By such configuration, an electromagnetic driving force will be induced inside the AF coil 3 by the current passing through the AF coil 3 and the magnetic field generated by the magnet set of magnets 61x, 61y, 62x, 62y, thereby the lens assembly 18 is driven to perform the auto-focusing function. Besides, the current passing through the OIS coils 91x, 91y, 92x, 92y and the magnetic field generated by the magnet set of magnets 61x, 61y, 62x, 62y will act to induce a further electromagnetic driving force inside the set of OIS coils, such that the lens assembly 18 may be tuned to perform the OIS function (i.e. the so-called anti-shaking function). Specifically, the electromagnetic driving force induced by the AF coil 3 and the magnets 61x, 61y, 62x, 62y enables the lens assembly 18 to move along the optical axis against the change in magnet flux of the magnets 61x, 61y, 62x, 62y, such that the auto-focusing function is realized. The OIS coil 92x interacts with the magnet 62x in a direction the same as the direction in which the OIS coil 91x interacts with the magnet 61x. Also, the OIS coil 92y interacts with the magnet 62y in a direction the same as the direction in which the OIS coil 91y interacts with the magnet 61y. In such a manner, the lens assembly 18, the AF coil 3 and the magnets 61x, 61y, 62x, 62y can move along the directions (i.e. the X-axis direction and/or the Y-axis direction) perpendicular to the optical axis with respect to the OIS coils 91x, 91y, 92x, 92y to realize the optical image stabilization (i.e. the so-called anti-shaking function).

Figure 3:
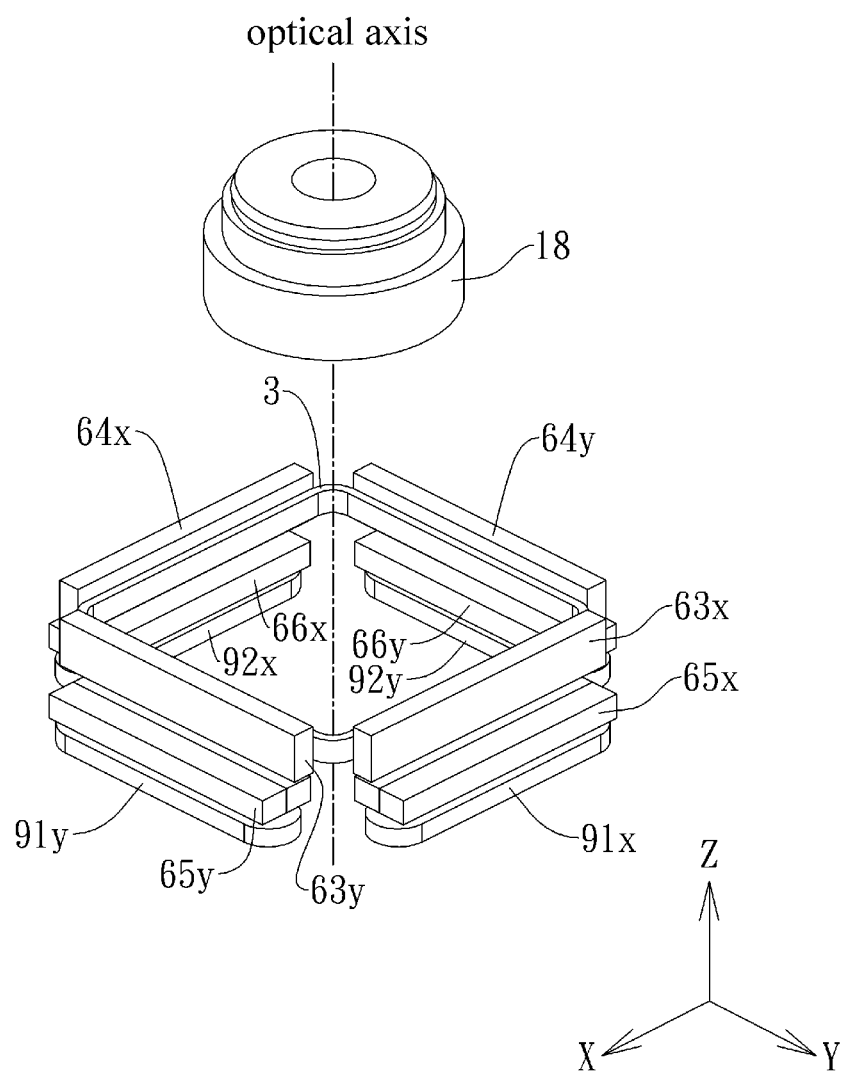
FIG. 3 is a schematic perspective view of a lens driving device according to a second embodiment of the present invention.
Figure 4:
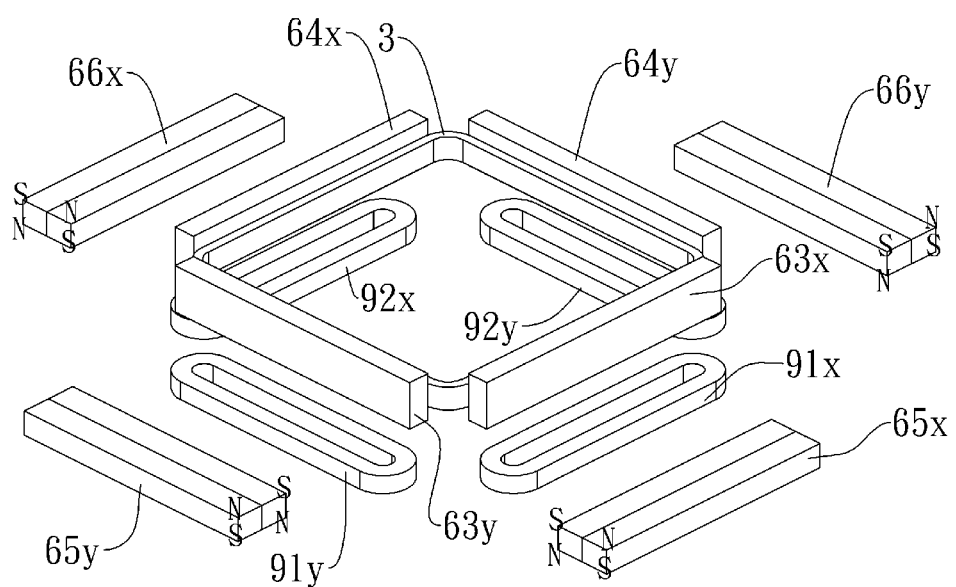
FIG. 4 is a schematic top exploded view of the lens driving device as shown in FIG. 3.
Figure 5:
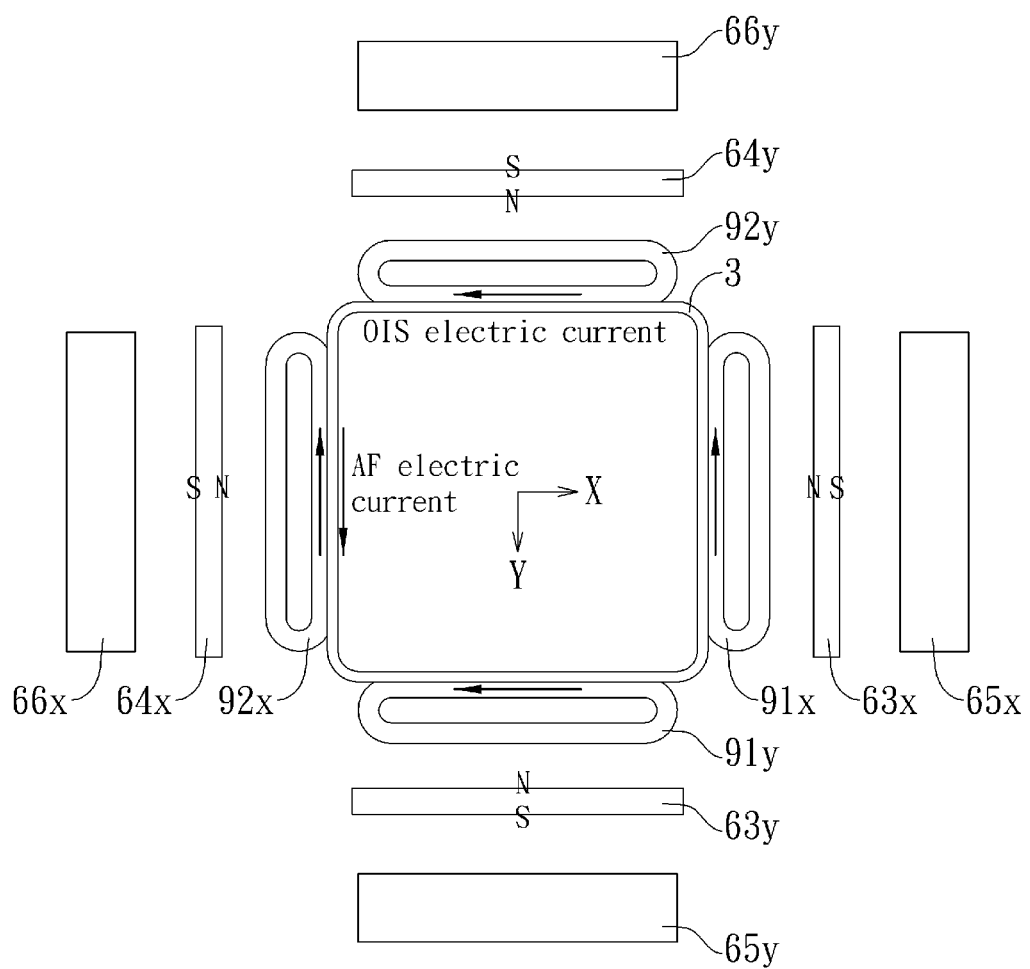
FIG. 5 is a schematic top exploded view for showing the magnetic field distribution in the structure as shown in FIG. 3.

FIGS. 3 to 5 schematically illustrate a lens driving device according to a second embodiment of the present invention, wherein FIG. 3 is a schematic perspective view of the lens driving device, and FIGS. 4 and 5 are schematic top exploded views showing the components and the distribution of magnet field of the lens driving device respectively. In this embodiment, the AF function and the OIS function of the lens driving lens are realized by a separate magnet scheme.

Referring to FIG. 3, the lens driving device according to this embodiment mainly includes a lens assembly 18 having an optical axis, an auto-focusing coil (AF coil) 3, a set of OIS coils 91x, 91y, 92x, 92y, and a magnet group. The magnet group includes a plurality of AF magnets 63x, 63y, 64x, 64y and a plurality of OIS magnets 65x, 65y, 66x, 66y. As shown in FIG. 3, the AF coil 3, the AF magnets 63x, 63y, 64x, 64y and the OIS magnets 65x, 65y, 66x, 66y are disposed around an outer surrounding of the lens assembly 18 with respect to the optical axis (i.e. the Z-axis). The OIS magnets 65x, 65y, 66x, 66y are positioned below the AF magnets 63x, 63y, 64x, 64y, respectively, and the OIS coils 91x, 91y, 92x, 92y, which are disposed on a plane having a normal direction perpendicular to the optical axis (e.g. the X-Y plane), are positioned under the respective OIS magnets 65x, 65y, 66x, 66y. The OIS coils 91x, 91y, 92x, 92y are arranged to sequentially face the respective OIS magnets 65x, 65y, 66x, 66y.

Referring to FIGS. 4 and 5, each of the AF magnets 63x, 63y, 64x, 64y has an inner N pole and an outer S pole. An electromagnetic driving force is induced in the AF coil 3 by the current passing through the AF coil 3 (the AF current) and the magnetic field generated by the AF magnets 63x, 63y, 64x, 64y, to perform the AF function. Besides, in the set of OIS coils, an electromagnetic driving force is induced by the current passing through the OIS coils 91x, 91y, 92x, 92y (the OIS current) and the magnetic field generated by the OIS magnets 65x, 65y, 66x, 66y to perform the OIS function (i.e. anti-shaking function). Specifically, by interaction of the AF coil 3 with each of the AF magnets 63x, 63y, 64x, 64y, the AF coil 3 and the lens assembly 18 can be moved along the optical axis with respect to the AF magnets 63x, 63y, 64x, 64y, such that the auto-focusing operation is carried out. The OIS coil 92x interacts with the magnet 66x in a direction the same as the direction in which the OIS coil 91x interacts with the magnet 65x. Also, the OIS coil 92y interacts with the magnet 66y in a direction the same as the direction in which the OIS coil 91y interacts with the magnet 65y. In such a manner, the lens assembly 18, the AF coil 3, the AF magnets 63x, 63y, 64x, 64y and the OIS magnets 65x, 65y, 66x, 66y can move along the directions (i.e. X-axis direction and/or Y-axis direction) perpendicular to the optical axis with respect to the OIS coils 91x, 91y, 92x, 92y to perform the OIS function (i.e. anti-shaking function).

Due to the fact that the current induced in a coil, such as an OIS coil, depends on the changing in the strength of magnetic field and thus the density of magnetic flux, it is advantageous to improve the magnetic sensitivity of the lens driving device by increasing the density of magnetic flux, so as to offset the shaking effect in a greater precision, and to further stabilize the optical image. The power consumption required for anti-shaking function can be reduced as well. For this purpose, the present invention also provides an improved structure for the lens driving device, in which the distribution of the magnet field as generated can be more concentrated, and the magnet sensitivity for the anti-shaking function will be improved accordingly.

Figure 6:
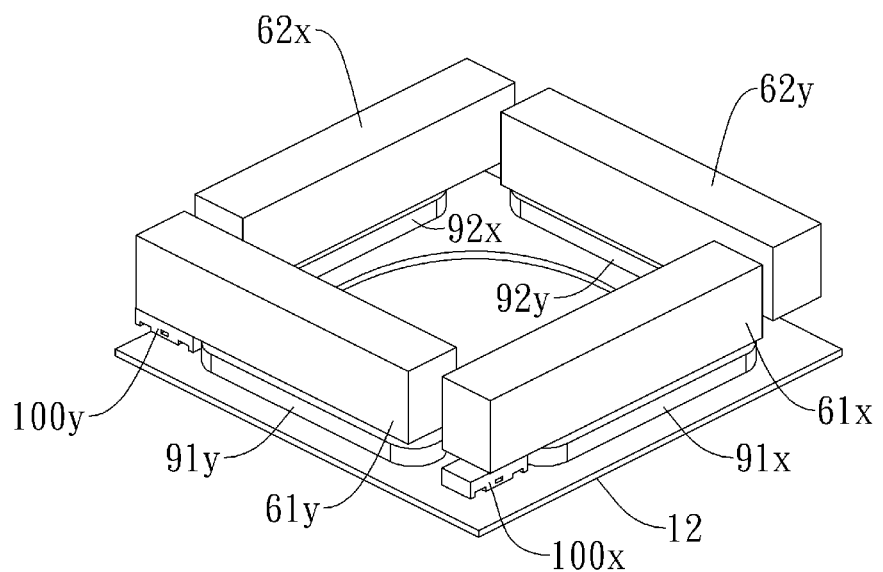
FIG. 6 is a schematic perspective view of a lens driving device according to a third embodiment of the present invention.
Figure 6:
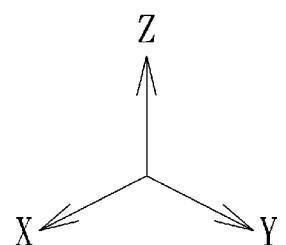
Figure 7:
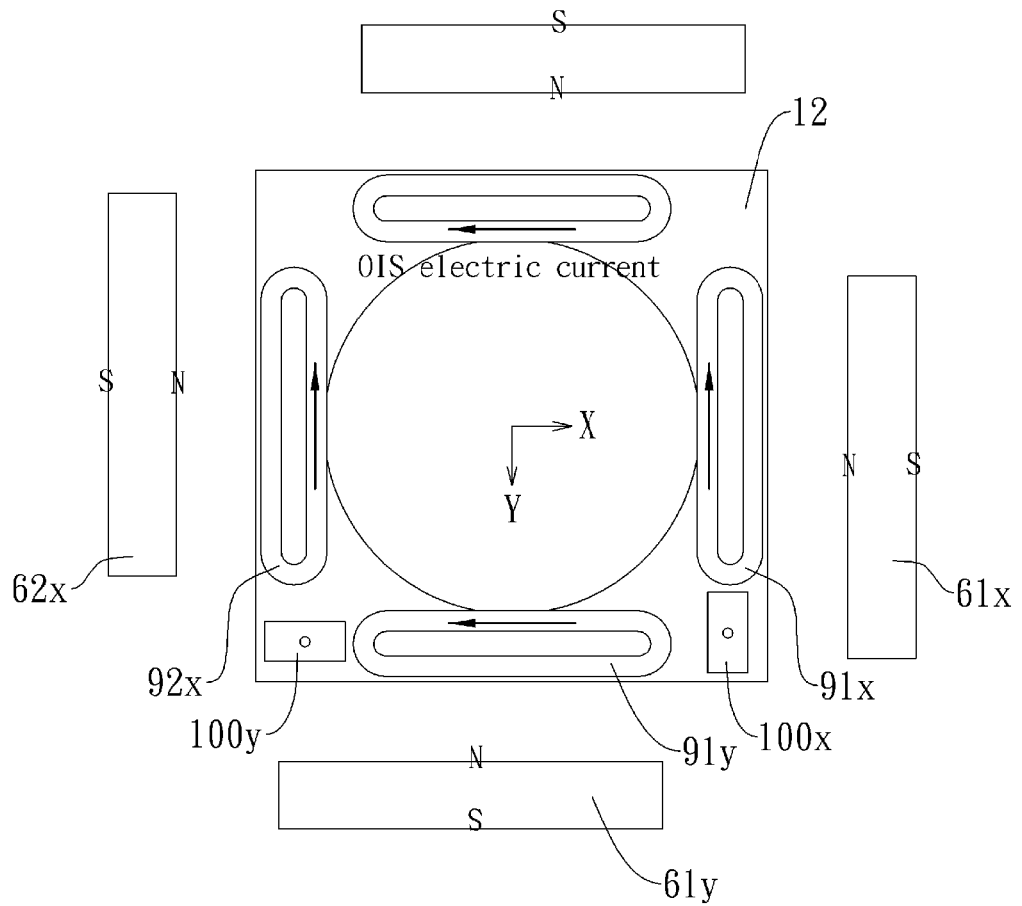
FIG. 7 is a schematic top exploded view of the lens driving device as shown in FIG. 6.

Please refer to FIG. 6 and FIG. 7, which are the schematic perspective view and the schematic top exploded view of a lens driving device according to a third embodiment of the present invention, respectively. In this embodiment, the lens driving device is also a VCA-based lens driving device and has a similar configuration as shown in FIGS. 1 and 2. Please note that the AF coil 3 (as shown in FIGS. 1 and 2) is omitted from FIGS. 6 and 7 for clarity. The present lens driving device mainly includes a lens assembly 18 having an optical axis, an auto-focusing coil (AF coil) (not shown), a set of OIS coils 91$x$, 91$y$, 92$x$, 92$y$, a plurality of magnets 61$x$, 61$y$, 62$x$, 62$y$, and a magnetic enhancement device 12. The lens driving device may optionally include at least one magnetic induction elements such as Hall sensors 100$x$ and 100$y$ to sense a magnet signal induced by a displacement of the magnets 61$x$, 61$y$, 62$x$, 62$y$. The optical axis of the lens assembly 18 is defined as the Z-axis for illustration. The magnets 61$x$, 61$y$, 62$x$, 62$y$ are disposed around an outer surrounding of the lens assembly 18 with respect to the optical axis. The OIS coils 91$x$, 91$y$, 92$x$, 92$y$ are disposed on a plane whose normal direction is perpendicular to the optical axis (e.g. the X-Y plane). In this embodiment of the present invention, the magnetic enhancement device 12 is disposed below and covering the set of OIS coils 91$x$, 91$y$, 92$x$, 92$y$ and Hall sensors 100$x$, 100$y$, so as to enhance the magnetic sensitivity of the lens driving device. In more specific, the magnetic driving force of the OIS coils 91$x$, 91$y$, 92$x$, 92$y$ and magnetic induction of the Hall sensors 100$x$, 100$y$ can be enhanced because the lines of magnetic force of the respective magnet atop the OIS coil and the magnetic enhancement device below the OIS coil is more concentrated at the OIS coil, such that the magnetic sensitivity of the OIS coils may be improved.

In the present invention, the magnetic enhancement device may be made from magnetic materials including, but not limited to, magnetic metals, alloys and/or ferromagnetic or ferrimagnetic materials. Please note that, by dispersing the magnetic particles in a bottom frame of the lens driving device, or by coating the bottom frame of the lens driving device with a magnetic layer, the bottom frame that is intrinsically non-magnetic can function as a magnetic enhancement device of the present invention. Alternatively, the plate-like magnetic enhancement device 12 as shown in FIG. 6 is provided as a bottom frame of the lens driving device of the present invention.

Figure 8:
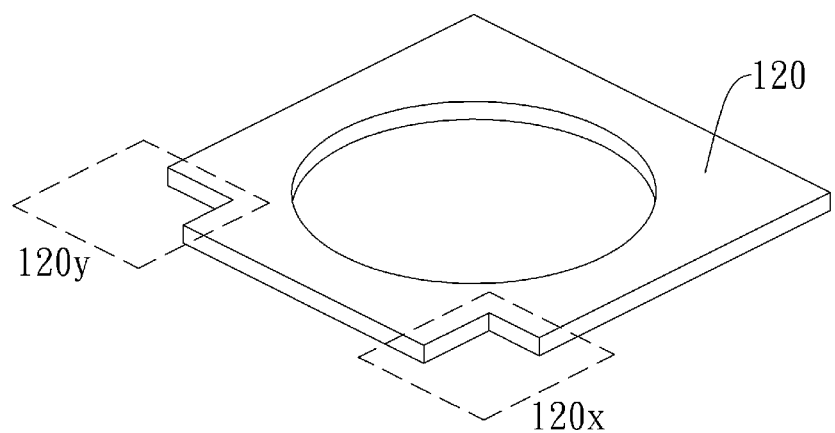
FIG. 8 is a schematic perspective view showing an exemplary magnetic enhancement device used in the lens driving device of the present invention.

Please refer to FIG. 8, which is a schematic perspective view showing an alternative exemplary magnetic enhancement device used in the lens driving device of the present invention. The magnetic enhancement device 120 as shown is a plate-like unitary piece, on which some portions may be removed (for example, by cutting) to form spaces 120$x$, 120$y$ for accommodating the Hall sensors 100$x$, 100$y$. It should be noted that, the magnetic enhancement device according to the present invention is shown, in the exemplary embodiments, as being used in the lens driving devices with winding OIS coils; however, the purposed magnetic enhancement device is also applicable for the FP-coil structure. That is, instead of the OIS coils as shown in the exemplary embodiments, a typical flexible printed circuit board, having FP-coils formed thereon and controlled by the flexible printed circuit, can be used in the lens driving device of the present invention, and in such a case, it may be advantageous to have the magnetic enhancement device 120 correspond to the flexible printed circuit board in shape. Alternatively, the magnetic enhancement device of the present invention can be formed as including plural magnetic pieces, and each of which is disposed as corresponding to the respective FP-coil on the flexible printed circuit board, or is disposed under a respective OIS coil, which will be further illustrated below.

Figure 9:
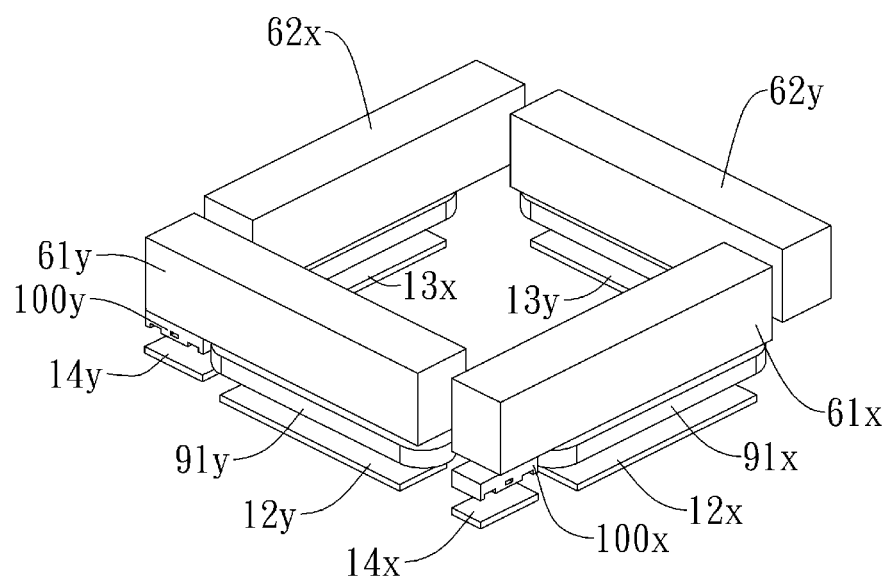
FIG. 9 is a schematic perspective view of a lens driving device according to a fourth embodiment of the present invention.
Figure 10:
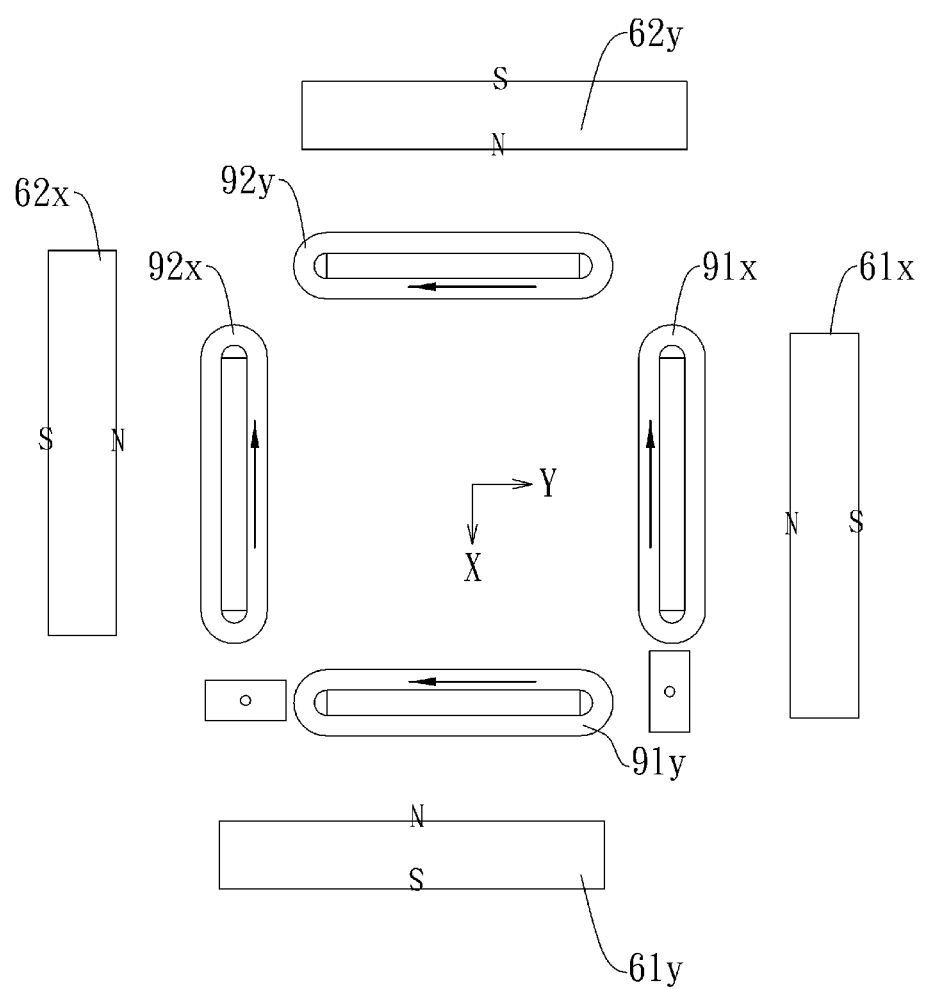
FIG. 10 is a schematic top exploded view of the lens driving device as shown in FIG. 9.

Please refer to FIG. 9 and FIG. 10, which are the schematic perspective view and the schematic top exploded view of a lens driving device according to a fourth embodiment of the present invention, respectively. In this embodiment, the VCA-based lens driving device has a similar configuration as shown in FIGS. 6 and 7, except the magnetic enhancement device. As shown in FIG. 9, the magnetic enhancement device includes plural magnetic pieces 12$x$, 12$y$, 13$x$, 13$y$, 14$x$, 14$y$, which are positioned below the OIS coils 91$x$, 91$y$, 92$x$, 92$y$ and the Hall sensors 100$x$, 100$y$, respectively. The current passing through the respective OIS coils 91$x$, 91$y$, 92$x$, 92$y$ is indicated by the arrow as shown. Also, the magnetic driving force of the OIS coils 91$x$, 91$y$, 92$x$, 92$y$ and magnetic induction of the Hall sensors 100$x$, 100$y$ can be enhanced because the lines of magnetic force of the respective magnet atop the OIS coil and the respective magnetic piece below the OIS coil are more concentrated at the OIS coil, such that the magnetic sensitivity thereof may be improved.

It should be noted that, the configuration of magnetic enhancement device as shown in FIG. 6 through FIG. 10 is only provided for illustration with respect to the lens driving device whose AF and OIS functions are realized by a common magnet scheme. Nevertheless, according to the present invention, the magnetic enhancement device is also applicable in the lens driving device whose AF and OIS functions are realized by a separate magnet scheme, such as the lens driving device as shown in FIGS. 3 to 5.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that structures within the scope of these claims and their equivalents be covered thereby.

What is claimed is:

1. A lens driving device, comprising:
    a lens assembly having an optical axis;
    an auto-focusing (AF) coil disposed around an outer surrounding of said lens assembly with respect to said optical axis;
    a set of optical image stabilization (OIS) coils disposed on a plane having a normal direction perpendicular to said optical axis;
    a plurality of magnets arranged above said set of OIS coils in such a way that each of said magnets has a first surface facing said AF coil and a second surface facing said OIS coils; and
    a magnetic enhancement device disposed under said set of OIS coils.

2. The lens driving device according to claim 1, wherein said magnetic enhancement device includes plural magnetic pieces, each of which being disposed under a respective OIS coil of said set of OIS coils.

3. The lens driving device according to claim 2, wherein said plural magnetic pieces are formed with a bottom frame of said lens driving device.

4. The lens driving device according to claim 2, wherein said plural magnetic pieces are embedded in a bottom frame of said lens driving device.

5. The lens driving device according to claim 1, wherein said magnetic enhancement device is formed by distributing a plurality of magnetic particles within a bottom frame of said lens driving device.

6. The lens driving device according to claim 1, further comprising at least one magnetic induction element sensing a magnet signal induced by a displacement of said magnets.

7. The lens driving device according to claim 6, wherein said magnetic enhancement device includes plural magnetic pieces, each of which being disposed under a respective OIS coil of said set of OIS coils or said at least one magnetic induction element.

8. The lens driving device according to claim 1, wherein said OIS coils are winding coils or coils that are formed on a flexible printed circuit board.

* * * * *